United States Patent [19]
Katoh et al.

[11] Patent Number: 5,313,792
[45] Date of Patent: May 24, 1994

[54] EXHAUST GAS PURIFICATION APPARATUS FOR AN INTERNAL COMBUSTION ENGINE

[75] Inventors: Kenji Katoh, Shizuoka; Satoshi Iguchi, Mishima; Tetsuro Kihara, Susono, all of Japan

[73] Assignee: Toyota Jidosha Kabushiki Kaisha, Toyota, Japan

[21] Appl. No.: 947,663

[22] Filed: Sep. 18, 1992

[30] Foreign Application Priority Data

Sep. 20, 1991 [JP] Japan .................................. 3-268706

[51] Int. Cl.⁵ .............................................. F01N 3/10
[52] U.S. Cl. ........................................ 60/301; 422/171; 60/297
[58] Field of Search ................ 60/301, 297; 423/213.7, 423/239.2, 213.5; 422/171, 177

[56] References Cited

U.S. PATENT DOCUMENTS

| | | | |
|---|---|---|---|
| 3,757,521 | 9/1973 | Tourtellotte et al. | 422/171 |
| 4,003,976 | 1/1977 | Komatsu et al. | 423/213.7 |
| 4,071,600 | 1/1978 | Schlatter et al. | 423/213.7 |
| 4,088,606 | 5/1978 | Fedor et al. | 60/301 |
| 4,297,328 | 10/1981 | Ritscher et al. | 60/301 |
| 5,041,270 | 8/1991 | Fujitani | 423/213.7 |

Primary Examiner—Richard R. Cole
Assistant Examiner—L. Heyman
Attorney, Agent, or Firm—Kenyon & Kenyon

[57] ABSTRACT

An exhaust gas purification system includes a transition metal/zeolite first catalyst, a three-way second catalyst, and a noble metal-type third catalyst arranged in that order in the direction of exhaust gas flow in an exhaust conduit of an internal combustion engine capable of fuel combustion at lean air-fuel ratios. NOx which has not been purified by the transition metal/zeolite first catalyst is oxidized by the three-way second catalyst into $NO_2$, which the noble metal-type third catalyst can easily decompose into $N_2$ and $O_2$.

10 Claims, 2 Drawing Sheets

EXHAUST GAS PURIFICATION APPARATUS FOR AN INTERNAL COMBUSTION ENGINE

BACKGROUND OF THE INVENTION

1. Field of the Invention

The present invention relates to an exhaust gas purification apparatus which includes a plurality of different kinds of catalysts arranged in series with each other and which can purify nitrogen oxides (hereinafter, NOx) included in exhaust gas from an internal combustion engine at lean air-fuel ratios at a higher NOx purification rate than the total of the NOx purification rates of the individual catalysts.

2. Description of the Related Art

To improve fuel economy and to suppress exhaust of carbon dioxide gas to thereby reduce global warming, engines capable of fuel combustion at lean air-fuel ratios (lean burn engines) are being developed and are partially in actual use. Since a conventional catalyst (three-way catalyst) cannot reduce and purify NOx at lean air-fuel ratios, there is a need to develop a catalyst or system that can purify NOx even at lean air-fuel ratios.

Japanese Patent Publication HEI 1-139145 proposes a copper (Cu)/zeolite catalyst in which copper is ion-exchanged on a zeolite carrier. This catalyst is capable of purifying NOx at lean air-fuel ratios. However, the NOx purification ability of the Cu/zeolite catalyst is poor at stoichiometric and rich air-fuel ratios. Further, the Cu/zeolite catalyst has little ability to purify hydrocarbons (hereinafter, HC) included in exhaust gas.

In order to purify HC at high engine power operating conditions and to decrease the amount of NOx exhausted into the atmosphere. Publication HEI 1-139145 further proposes to install a platinum (Pt)/alumina catalyst for oxidizing HC and CO included in the exhaust gas in a portion of the exhaust conduit located downstream of the Cu/zeolite catalyst. However, in this known apparatus, the ability of the Pt/alumina catalyst to purify whatever NOx has passed through the Cu/zeolite catalyst without being completely reduced by the Cu/zeolite catalyst is small.

The reasons why the NOx purification ability of the Pt/alumina catalyst in the Cu/zeolite-Pt/alumina exhaust gas purification system is small are thought to be as follows:

One reason is that the NOx which flows from the Cu/zeolite catalyst to the Pt/alumina catalyst is mainly in the form of NO, and the Pt/alumina catalyst has little capability for decomposing NO into $N_2$ and $O_2$. Another reason is that, in a high power condition, a relatively large amount of HC flows to the Pt/alumina catalyst. The HC will gradually degrades the catalyst and thus shortens its life.

SUMMARY OF THE INVENTION

An object of the invention is to provide an exhaust gas purification apparatus for an internal combustion engine which includes a plurality of different kinds of catalysts and which can purify NOx included in exhaust gas from the engine at lean air-fuel ratios at a higher NOx purification rate than the total of the NOx purification rates of the individual catalysts.

The above-described object is achieved by an exhaust gas purification apparatus for an internal combustion engine in accordance with the present invention wherein a transition metal/zeolite first catalyst, a three-way second or intermediate catalyst, and a noble metal-type third catalyst are arranged in that order in the direction of exhaust gas flow in an exhaust conduit connected to the engine.

In this apparatus, the transition metal/zeolite first catalyst reduces most of the NOx in the exhaust gas to at least NO. Then the intermediate three-way catalyst installed upstream of the noble metal-type third catalyst oxidizes the NO into $NO_2$. The $NO_2$ flows to the noble metal-type catalyst and is almost completely decomposed into $N_2$ and $O_2$, because the noble metal-type catalyst can decompose $NO_2$ much more effectively than it can decompose NO. As a result, the NOx purification rate of the system is increased despite the inability of the the three-way catalyst by itself to purify NOx in an oxidizing condition.

BRIEF DESCRIPTION OF THE DRAWINGS

The above-described object and other objects, features, and advantages of the present invention will become more apparent and will be more readily appreciated from the following detailed description of the preferred embodiment of the invention taken in conjunction with the accompanying drawings, in which.

DETAILED DESCRIPTION OF THE PREFERRED EMBODIMENT

Figure 1:
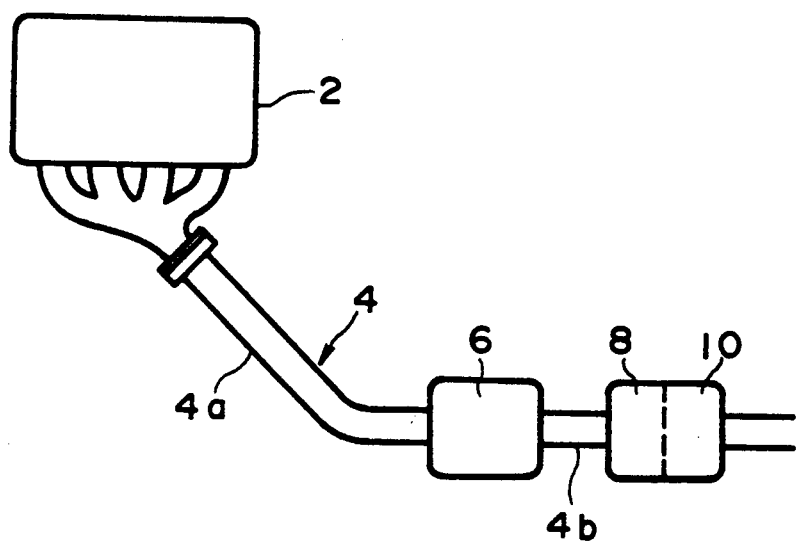
FIG. 1 is a schematic diagram of an exhaust gas purification apparatus for an internal combustion engine in accordance with one embodiment of the invention.

As illustrated in FIG. 1, an exhaust gas purification apparatus for an internal combustion engine 2 of the invention includes three kinds of catalysts arranged in series in an exhaust conduit 4 of the internal combustion engine, which is capable of fuel combustion at lean air-fuel ratios. More particularly, the three kinds of catalysts are a transition metal/zeolite first catalyst 6, which comprises a zeolite carrier on which at least one kind of transition metal is ion-exchanged, a three-way second catalyst 8 including platinum (Pt) and rhodium (Rh), and a noble metal-type third catalyst 10 including at least one kind of noble metal such as platinum. The transition metal of the transition metal/zeolite catalyst is, for example, copper (Cu) or cobalt (Co). A carrier of the noble metal-type catalyst for carrying platinum is alumina or zeolite.

Figure 2:
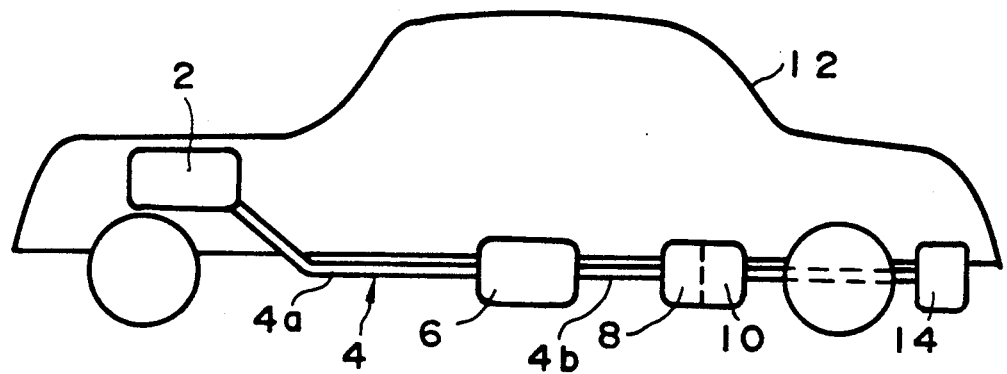
FIG. 2 is a schematic side elevational view of the exhaust gas purification system of FIG. 1 mounted in an automobile.

The three kinds of catalysts are arranged in the order of the transition metal/zeolite first catalyst 6, the three-way second catalyst 8, and the noble metal-type third catalyst 10 in the direction of exhaust gas flow. The arrangement should not be changed from that order As illustrated in FIG. 2, all three of the catalysts 6, 8, 10 are located under a floor of the automobile 12. A muffler 14 is disposed downstream of the noble metal-type third catalyst 10. The exhaust conduit 4 connected to the engine 2 includes a first portion 4a located between the engine 2 and the transition metal/zeolite first catalyst 6 and a second portion 4b located between the first catalyst 6 and the noble metal-type third catalyst 10.

The length of the first portion 4a of the exhaust conduit 4 is determined so that the exhaust gas temperature decreases due to natural heat loss from 850°-950° C. at the engine outlet to a temperature below 600° C., preferably a temperature in the range of 300° C. to 500° C., at an inlet of the transition metal/zeolite catalyst 6 while flowing through the first portion 4a. Since such a length of the first portion 4a for decreasing the exhaust gas temperature is relatively long, the transition metal/zeolite catalyst 6 is located far from the engine 2 and is located under the automobile floor. The length of the second portion 4b of the exhaust gas conduit 4 is determined so that the exhaust gas temperature further decreases by 100° C.-150° C. while the exhaust gas flows through the second portion 4b.

The reasons for the above-described arrangement of the three kinds of catalysts will now be explained.

There are two reasons for locating the transition metal/zeolite first catalyst 6 upstream of the three-way second catalyst 8 and the noble metal-type third catalyst 10.

One reason is that the transition metal/zeolite catalyst 6 requires HC to reduce NOx, because radicals produced through partial oxidation of HC react with NOx to thereby reduce NOx. Thus, the more HC that is included in the exhaust gas, the greater will be the NOx purification rate. In contrast, the noble metal-type catalyst 10, for example Pt/alumina catalyst, is degraded by excessive HC (hereinafter HC degradation).

If the noble metal-type catalyst were located upstream of the transition metal/zeolite catalyst, the large amount of HC included in the exhaust gas flowing to the noble metal-type catalyst would cause HC degradation, and almost all of the HC would be oxidized by the noble metal-type catalyst. Then, the amount of HC flowing to the transition metal/zeolite catalyst would be too small, resulting in a low NOx purification rate for the transition metal/zeolite catalyst. However, in the invention, the HC included in the exhaust gas from the engine flows directly to the transition metal/zeolite first catalyst 6, so that a portion of the HC will be partially oxidized to produce a sufficient amount of radicals, and the NOx purification rate of the transition metal/zeolite catalyst 6 will be higher. Since most of the HC included in the exhaust gas is either perfectly or partially oxidized by the transition metal/zeolite first catalyst, the amount of HC included in the gas flowing into the noble metal-type third catalyst 10 is small, so that HC degradation of the noble metal-type catalyst 10 is effectively suppressed.

Figure 3:
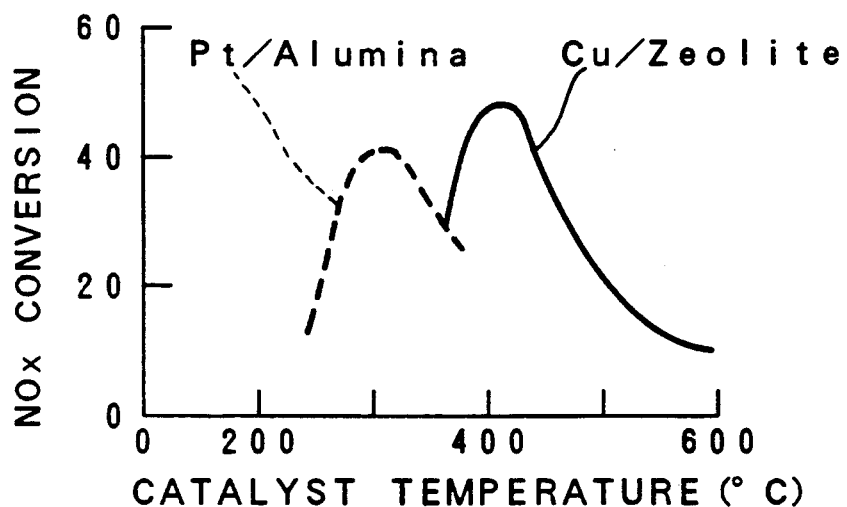
FIG. 3 is a graphical representation of NOx purification rate or NOx conversion versus catalyst temperature characteristics of a Cu/zeolite catalyst and a Pt/alumina catalyst.

Another reason for locating the transition metal/zeolite catalyst upstream of the three-way and noble metal/type catalysts is that, as illustrated in FIG. 3, in the transition metal/zeolite catalyst 6 the NOx conversion rate peaks at a temperature in the range of 400° C.-500° C., while the noble metal-type catalyst 10 peaks at about 300° C. By locating the transition metal/zeolite catalyst 6 upstream of the noble metal/type catalyst, at the portion of the exhaust conduit where the exhaust gas temperature is at 400° C.-500° C. due to natural heat loss, the exhaust gas temperature at the noble metal-type third catalyst 10 located downstream of the transition metal/zeolite first catalyst will be lower than that temperature and will be at about 300° C. As a result, both catalysts 6 and 10 will operate at their peak NOx conversion rates.

There are also two reasons why the three-way second catalyst 8 is located upstream of the noble metal-type third catalyst 10.

One reason is that most of the NOx which has passed through the transition metal/zeolite catalyst 6 without being completely decomposed is in the form of NO. The NO flowing to the three-way catalyst 8 is oxidized and converted to the form of $NO_2$ by the three-way catalyst 8. The noble metal-type catalyst 10 can more easily decompose $NO_2$ into $N_2$ and $O_2$ than it can decompose NO into $N_2$ and $O_2$. Therefore, the undecomposed NOx remaining in the exhaust gas flowing from the first catalyst can be purified by the noble metal type third catalyst with a high conversion rate. As a result, the NOx purification characteristic of the apparatus having a three-way catalyst located upstream of the noble metal-type catalyst is better than that of an apparatus having no three-way catalyst, even though the three-way catalyst itself has little NOx reduction ability at lean air-fuel ratios.

Another reason for placing the three-way catalyst ahead of the noble metal-type catalyst is that HC having passed the transition metal/zeolite first catalyst flows to the three-way second catalyst where the HC is almost perfectly oxidized by the three-way catalyst 8. Since the amount of HC included in the exhaust gas having passed through the three-way catalyst 8 is very small, HC degradation of the noble metal-type catalyst 10 will be effectively suppressed. As a result, the durability of the noble-metal catalyst 10 and the durability of the apparatus as a whole is greatly improved.

The reason for locating the three-way intermediate catalyst 8 downstream of the transition metal/zeolite first catalyst 6 is to maintain a large amount of HC included in the exhaust gas flowing to the transition metal/zeolite catalyst. If the three-way catalyst were located upstream of the transition metal/zeolite catalyst, the HC included in the exhaust gas would be oxidized by the three-way catalyst and would be insufficient to produce radicals at the transition metal/zeolite catalyst.

The reason for locating the transition metal/zeolite first catalyst 6 under an automobile floor is to maintain the temperature of the exhaust gas flowing into the transition metal/zeolite catalyst at about 400° C.-500° C. even at high engine powers, so that the transition metal/zeolite catalyst 6 can be used in the temperature range near its highest NOx conversion rate. Further, since the transition metal/zeolite catalyst is thermally degraded in a relatively short period of time at temperatures above about 600° C., the under-floor arrangement of the transition metal/zeolite catalyst 6 is desirable from the viewpoint of keeping the catalyst below its thermal degradation temperature.

Operation of the exhaust gas purification apparatus will now be explained.

Figure 4:
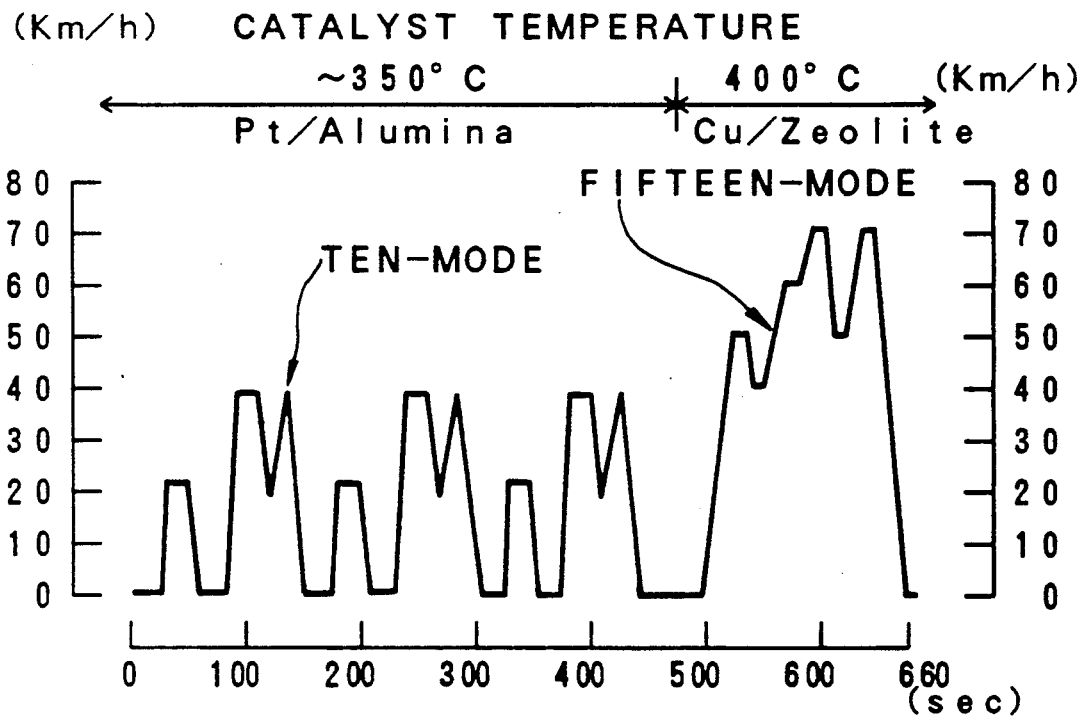
FIG. 4 is a graph illustrating a relationship between temperatures of catalysts and test running patterns

The exhaust gas from the internal combustion engine 2, which includes a relatively great amount of HC, will decrease in temperature to about 500° C. while passing through the first portion 4a of the exhaust conduit 4. FIG. 4 illustrates the relationship between the catalyst temperature of the apparatus and the vehicle speed in ten-mode and fifteen-mode running tests. From FIG. 4, it is seen that the catalyst temperature will be in the range of 350° C.-400° C. at normal vehicle speeds corresponding to the ten-mode test and will be at about 500° C. at high vehicle speeds corresponding to the fifteen-mode test. Since the catalyst temperature is maintained below about 500° C., the transition metal/zeolite first catalyst 6 can show a high NOx purification rate and further it is not HC-degraded. As a result, the NOx purification characteristic and durability of the apparatus are improved.

Then, the exhaust gas flows into the three-way second catalyst 8. Even in the lean burn engine, the exhaust gas lacks oxygen in a high power operating condition, and the NOx reduction ability of the transition metal/zeolite first catalyst 6 decreases. However, in such a rich air-fuel ratio condition, the NOx included in the exhaust gas in the form of NO is oxidized by the three-way second catalyst 8 into $NO_2$. Further, since the three-way catalyst 8 also oxidizes HC and CO, the HC and CO emissions will be suppressed.

Then the exhaust gas flows from the three-way second catalyst 8 to the noble metal-type third catalyst 10. Since NO has been converted into the form of $NO_2$ by the three-way second catalyst 8, the noble metal-type third catalyst 10 can almost perfectly purify the remaining NOx. Further, since the HC has been oxidized by the three-way catalyst 8, the noble metal-type catalyst 10 is almost free from HC degradation. Thus, the NOx purification rate and durability of the apparatus are improved to a great extent.

TABLE 1 summarizes the NOx purification characteristics and durability of various apparatuses including the apparatus of the invention, the apparatus of Japanese Patent Publication HEI 1-139145, a comparison apparatus having a Cu/zeolite catalyst only, a comparison apparatus having a three-way catalyst only, and a comparison apparatus having a Pt/alumina catalyst only.

As seen from TABLE 1, despite the fact that the three-way catalyst has no NOx purification ability at lean air-fuel ratios, provision of the three-way second catalyst between the Cu/zeolite first catalyst and the Pt/alumina third catalyst effectively increases the NOx purification characteristic at the lean air-fuel ratios. Accordingly, the apparatus can exhibit a higher NOx purification characteristic than the total of the NOx purification characteristic of the three-way catalyst only and the NOx purification characteristic of an assembly of the Cu/zeolite catalyst and the Pt/alumina catalyst.

TABLE 1

| Catalyst or System | NOx purification rate at lean air-fuel ratios |
| --- | --- |
| (1) Cu/zeolite catalyst only | Good |
| (2) three-way catalyst only | No Effect |
| (3) Pt/alumina catalyst only | Medium |
| (4) Cu/zeolite catalyst + Pt/alumina catalyst (HEI 1-139145) | Good |
| (5) Cu/zeolite catalyst + three-way catalyst + Pt/alumina catalyst (Present Invention) | Very Good |

In accordance with the invention, since the transition metal/zeolite first catalyst, the three-way second catalyst, and the noble metal-type third catalyst are arranged in that order in the direction of exhaust gas flow in the exhaust conduit of the internal combustion engine, the NOx purification characteristic and durability of the apparatus are greatly increased.

Although only one embodiment of the invention has been described in detail above, those skilled in the art will appreciate that various modifications and alterations can be made to the particular embodiment shown without materially departing from the novel teachings and advantages of the present invention. Accordingly, all such modifications and alterations are included within the spirit and scope of the invention as defined by the following claims.

We claim:

1. An exhaust gas purification apparatus for an internal combustion engine comprising:
   an internal combustion engine capable of fuel combustion at lean air-fuel ratios;
   an exhaust conduit, an upstream end of which is connected to the internal combustion engine, wherein exhaust gas from the internal combustion engine enters the exhaust conduit at the upstream end and travels through the exhaust conduit to a downstream end thereof;
   an $NO_x$ reducing transition metal/zeolite first catalyst installed in the exhaust conduit and including a transition metal deposited on a zeolite carrier;
   a three-way second catalyst installed downstream of the transition metal/zeolite catalyst in the exhaust conduit, wherein the three-way second catalyst is capable of oxidizing NO into $NO_2$; and
   an $NO_2$ reducing noble metal-type third catalyst installed downstream of the three-way catalyst in the exhaust conduit and including a noble metal deposited on a carrier.

2. An exhaust gas purification apparatus according to claim 1, wherein the transition metal of the first catalyst includes copper.

3. An exhaust gas purification apparatus according to claim 1, wherein the transition metal of the first catalyst includes cobalt.

4. An exhaust gas purification apparatus according to claim 1, wherein the noble metal-type catalyst comprises platinum on a zeolite carrier.

5. An exhaust gas purification apparatus according to claim 1, wherein the noble metal-type catalyst comprises platinum of an alumina carrier.

6. An exhaust gas purification apparatus according to claim 1, wherein the engine is mounted in a vehicle including a vehicle floor and the transition metal/zeolite first catalyst, the three-way second catalyst, and the noble metal-type third catalyst are located under the vehicle floor.

7. An exhaust gas purification apparatus according to claim 1, wherein the exhaust conduit includes a first portion between the internal combustion engine and the transition metal/zeolite first catalyst, the first portion of the exhaust conduit being long enough to decrease the exhaust gas temperature from 850°–950° C. at an engine outlet to below 600° C. at an inlet of the transition metal/zeolite first catalyst due to natural heat loss while the exhaust gas flows through the first portion of the exhaust conduit.

8. An exhaust gas purification apparatus according to claim 7, wherein the temperature to which the exhaust gas temperature is decreased at the inlet of the transition metal/zeolite first catalyst is in the range of 300° C.–500° C.

9. An exhaust gas purification apparatus according to claim 7, wherein the exhaust conduit includes a second portion between the transition metal/zeolite first catalyst and the noble metal-type third catalyst, the second portion of the exhaust conduit being long enough to decrease the exhaust gas temperature by 100°–150° C. due to natural heat loss while the exhaust gas flows through the second portion of the exhaust conduit.

10. An exhaust gas purification apparatus according to claim 9, wherein the exhaust gas temperature has been decreased to about 300° C. at an inlet of the noble metal-type third catalyst.

* * * * *

UNITED STATES PATENT AND TRADEMARK OFFICE
CERTIFICATE OF CORRECTION

PATENT NO. : 5,313,792
DATED : May 24, 1994
INVENTOR(S) : Kenji KATOH, et al.

It is certified that error appears in the above-identified patent and that said Letters Patent is hereby corrected as shown below:

Column 6, line 35, change "of" to --on--.

Signed and Sealed this

Fourth Day of October, 1994

*Attest:*

BRUCE LEHMAN

*Attesting Officer*     *Commissioner of Patents and Trademarks*